United States Patent
Rankin

[11] Patent Number: 6,067,682
[45] Date of Patent: May 30, 2000

[54] CUP OR DISC FOR USE AS A PART OF A PIPELINE PIG

[75] Inventor: William Jack Rankin, Sapulpa, Okla.

[73] Assignee: TDW Delaware, Inc., Wilmington, Del.

[21] Appl. No.: 09/107,711

[22] Filed: Jun. 29, 1998

Related U.S. Application Data

[60] Provisional application No. 60/052,602, Jul. 15, 1997.

[51] Int. Cl.[7] .................................................. B08B 9/04
[52] U.S. Cl. ......................................................... 15/104.061
[58] Field of Search ........................ 15/3.5, 3.51, 104.061

[56] References Cited

U.S. PATENT DOCUMENTS

| | | | |
|---|---|---|---|
| 616,696 | 12/1898 | Cochran | ..................................... 15/3.51 |
| 2,275,190 | 3/1942 | Lowry . | |
| 2,276,109 | 3/1942 | Smith . | |
| 2,763,017 | 9/1956 | Redin | ................................. 15/104.061 |
| 3,006,415 | 10/1961 | Burns et al. . | |
| 3,496,588 | 2/1970 | VerNooy . | |
| 3,576,043 | 4/1971 | Zongker . | |
| 3,605,896 | 9/1971 | Perkins . | |
| 3,691,584 | 9/1972 | Landers . | |
| 3,766,587 | 10/1973 | French . | |
| 3,857,132 | 12/1974 | Knapp et al. . | |
| 4,069,535 | 1/1978 | Cato . | |
| 4,083,074 | 4/1978 | Curtis . | |
| 4,178,649 | 12/1979 | Kouse | ................................ 15/104.061 |
| 4,248,299 | 2/1981 | Roeder . | |
| 4,275,475 | 6/1981 | Schwartz et al. . | |
| 4,378,838 | 4/1983 | Ogden et al. . | |
| 4,413,370 | 11/1983 | Payne et al. . | |
| 4,893,684 | 1/1990 | Alexander . | |
| 4,984,322 | 1/1991 | Cho et al. . | |
| 5,113,940 | 5/1992 | Glaser . | |
| 5,127,125 | 7/1992 | Skibowski . | |
| 5,246,069 | 9/1993 | Glaser et al. . | |
| 5,295,279 | 3/1994 | Cooper . | |
| 5,433,270 | 7/1995 | LaFleur . | |
| 5,533,570 | 7/1996 | Streich et al. . | |
| 5,699,577 | 12/1997 | Rankin . | |

FOREIGN PATENT DOCUMENTS

| | | |
|---|---|---|
| 2 492 281 | 4/1982 | France . |
| 2 632 547 | 12/1989 | France . |
| 35 11 260 | 10/1986 | Germany . |

*Primary Examiner*—Randall E. Chin
*Attorney, Agent, or Firm*—Head, Johnson & Kachigian

[57] ABSTRACT

An improved cup for use as a part of a pipeline pig is in the form of an elastomeric cup member having an outer circumferential pipe engaging portion defined by a plurality of at least three closely spaced apart integral circumferential lip portions, the lip portions being separately flexible with respect to each other and each of the lip portions having a length that is at least twice its thickness. The multiple-lip cup may be removably attached to a pipeline pig body or be made integral with an elastomeric pipe pig body.

26 Claims, 6 Drawing Sheets

CUP OR DISC FOR USE AS A PART OF A PIPELINE PIG

REFERENCE TO PENDING APPLICATIONS

This application claims the benefit of and incorporates by reference prior filed Provisional Application No. 60/052,602 filed Jul. 15 1997 entitled "Multi-lip Cup or Disc For Use On A Pipeline Pig".

REFERENCE TO MICROFICHE APPENDIX

This application is not referenced in any microfiche appendix.

BACKGROUND OF THE INVENTION

I. Field of the Invention

This invention relates to pipeline pigs for use in filling or emptying pipelines, for efficient cleaning of the interior of pipelines, for internal corrosion control and for fluid separation and gathering. Particularly the invention relates to a type of squeegee cup for use as a part of a pipeline pig.

II. Description of the Prior Art

The use of apparatus that is moved by fluid flow in the interior of a pipeline is well known and is frequently referred to as a "pipeline pig". The terms "pipeline pig" or simply "pig" are commonly employed in industry. Pigs are employed during the construction of pipelines as well as during the operational life of pipelines. Some operators run pigs through their pipelines on a scheduled basis.

Pipeline pigs are essential for effectively filling or emptying a pipeline, for efficient cleaning of the interior wall of a pipeline, for internal corrosion control, for fluid separation and for gathering out fluids from within pipelines.

For general information as to the application and use of pipeline pigs, reference may be had to an article entitled "Fundamentals of Pipeline Pigging", authored by Burt VerNooy, appearing in *Pipeline Industry*, September/October 1980, published by the Gulf Publishing Company of Houston, Tex. For additional background information relating to pipeline pigs of the type to which the present invention pertains, reference may be had to the following prior issued United States Patents:

| U.S. Pat. No. | INVENTOR | TITLE |
| --- | --- | --- |
| 2,275,190 | Lowry | Water Main Cleaning Device |
| 2,276,109 | Smith | Pipe-Line Cleaner |
| 3,006,415 | Burns et al | Cementing Apparatus |
| 3,496,588 | VerNooy | Pipeline Pig |
| 3,576,043 | Zongker | Pipeline Pig With Spring-Mounted Scrapers |
| 3,605,896 | Perkins | Liner Top Squeeze Plug Below Retrievable Tool |
| 3,691,584 | Landers | Disc Supported Cup |
| 3,857,132 | Knapp et al | Pipeline Pig Operable In Two Directions |
| 4,069,535 | Cato | Pipeline Pig |
| 4,083,074 | Curtis | Multipurpose Pipeline Pig |
| 4,248,299 | Roeder | Packer Nose Assembly |
| 4,275,475 | Schwartz et al | Pipeline Pig |
| 4,378,838 | Odgen et al | Pipe Wipers and Cups Therefor |
| 4,413,370 | Payne et al | Unitary Pig For Use In A Pipeline |
| 4,893,684 | Alexander | Method of Changing Well Fluid |
| 4,984,322 | Cho et al | Elastomeric Disc For Use On A Pipeline Pig |
| 5,113,940 | Glaser | Well Apparatuses and Anti-Rotation Device For Well Apparatuses |
| 5,127,125 | Skibowski | Pipeline Scraper |
| 5,246,069 | Glaser et al | Self-Aligning Well Apparatuses and Anti-Rotation Device For Well Apparatuses |
| 5,295,279 | Cooper | Cup For Use On A Pipeline |
| 5,433,270 | LaFleur | Cementing Plug |
| 5,533,570 | Streich et al | Apparatus For Downhole Injection and Mixing of Fluids Into A Cement Slurry |
| 5,699,577 | Rankin | Magnetic Cleaning Pig |

BRIEF SUMMARY OF THE INVENTION

This invention relates to a multiple-lip cup, which may also be termed a squeegee-type cup, for use as a part of a pipeline pig. A typical pipeline pig includes, in one embodiment, a longitudinal body of external diameter substantially less than the internal diameter of the pipeline in which it is intended to be used. The longitudinal body, which is commonly made of metal, has a forward and a rearward end. A first pipeline interior wall engaging structure is affixed to the body adjacent the forward end and a second pipeline interior wall engaging structure is affixed to the body adjacent the rearward end. By "pipeline interior wall engaging structure" is meant a device that contacts the interior wall of the pipeline and centrally supports the pig body within the pipeline. At least one of the wall engaging structures must be of a type that seals or at least substantially seals against the interior wall of the pipeline so that the flow of fluids, either liquids or gases, will move the pig through the interior of the pipeline, that is, the typical pipeline pig of the type to which the present invention is concerned is moved only by the force of liquid or gas flow through the pipeline.

At least one wall engaging structures of a pipeline pig of this invention is in the form of a squeegee cup, that is, an elastomeric member having an inner portion by which it is affixed to a longitudinal body and an outer circumferential pipeline wall engaging portion which is defined by a plurality of integral circumferential lip portions. The integral lip portions include at least three spaced apart integral circumferential lips that are separately flexible with respect to each other. Each of the lip portions has a radial length that is at least twice its thickness.

Another embodiment of the invention is a pipeline pig having a body portion and pipeline interior wall engaging structures that are integrally formed of elastomeric materials. In this integral elastomeric design the outer circumferential portions of at least one wall engaging portion, whether in the shape of a cup or a disc, has a plurality of integral circumferential pipeline wall engaging lips.

The essence of this invention is a pipeline pig, cup or disc formed of an elastomeric material, such as plastic, urethane being a preferred type of plastic, having highly flexible circumferential closely spaced to each other lips that function as circumferential squeegees against the interior wall of the pipeline through which the pig traverses. The lips have sufficient flexibility to deflect when an object extending into the pipeline is encountered. Circumferential or longitudinal weld bead, areas of encrustation and dents are common types of objects encountered in a pipeline.

A more complete understanding of the invention will be obtained from the following description of the preferred embodiments and claims, taken in conjunction with the attached drawings.

DESCRIPTION OF THE DRAWINGS

FIG. 2 is representative of the prior art.

FIG. 3 is representative of the prior art.

FIG. 6 is an enlarged fragmentary view of a cross-section of a wall of a pipeline having a circumferential welding bead, such as shown in FIG. 2, and showing the squeegee cup of this invention as previously illustrated in FIG. 5. FIG. 6 showing that the squeegee cup of this invention maintains improved sealing contact with the pipe sidewall when a circumferential weld is passed.

FIG. 10 is an elevational external view of a different embodiment of a pipeline pig that includes the principals of this invention. Whereas FIG. 1 illustrates a pipeline pig having a central longitudinal body, typically made of metal, such as steel, FIG. 10 is an illustration of an embodiment of the pig in which the pig body and the cups are integrally formed of elastomeric material.

DETAILED DESCRIPTION OF THE PREFERRED EMBODIMENTS

A multi-lip cup or disc is provided for use on a device (pipeline pig) which is passed through a pipeline, the pipeline having a cylindrical internal wall. The multi-lip cup or disc maintains an effective seal as the device passes through the pipeline due to its numerous, flexible sealing lips. The multi-lip cup or disc more effectively seals against the interior wall of a pipeline than existing conventional cups and discs.

During the processes of filling or emptying a pipeline, when converting a pipeline from one fluid product to another, when separating two different fluid products as they travel through a pipeline, and when drying a pipeline it is important to use a pipeline pig having effective sealing capabilities.

Conventional cups or discs (See FIGS. 2 and 3) sometimes do not seal effectively particularly when there is a protrusion into the bore of the pipeline.

Figure 5:
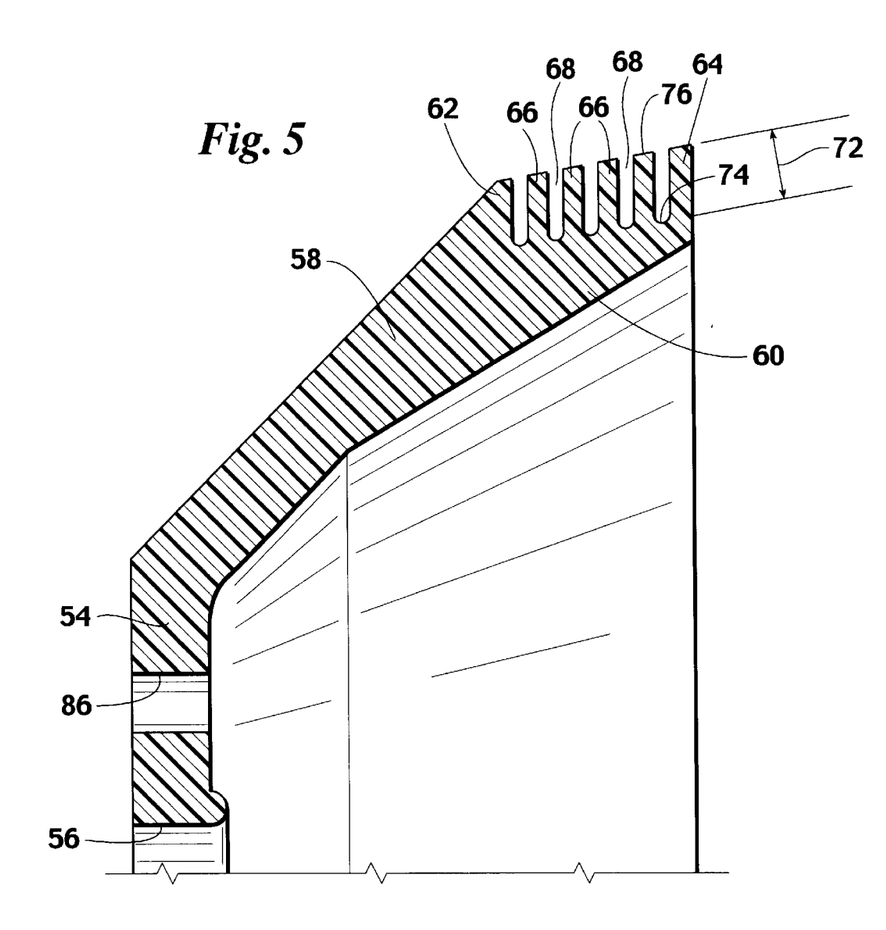
FIG. 5 is an enlarged fragmentary cross-sectional view of the squeegee cup of FIG. 4.
Figure 6:
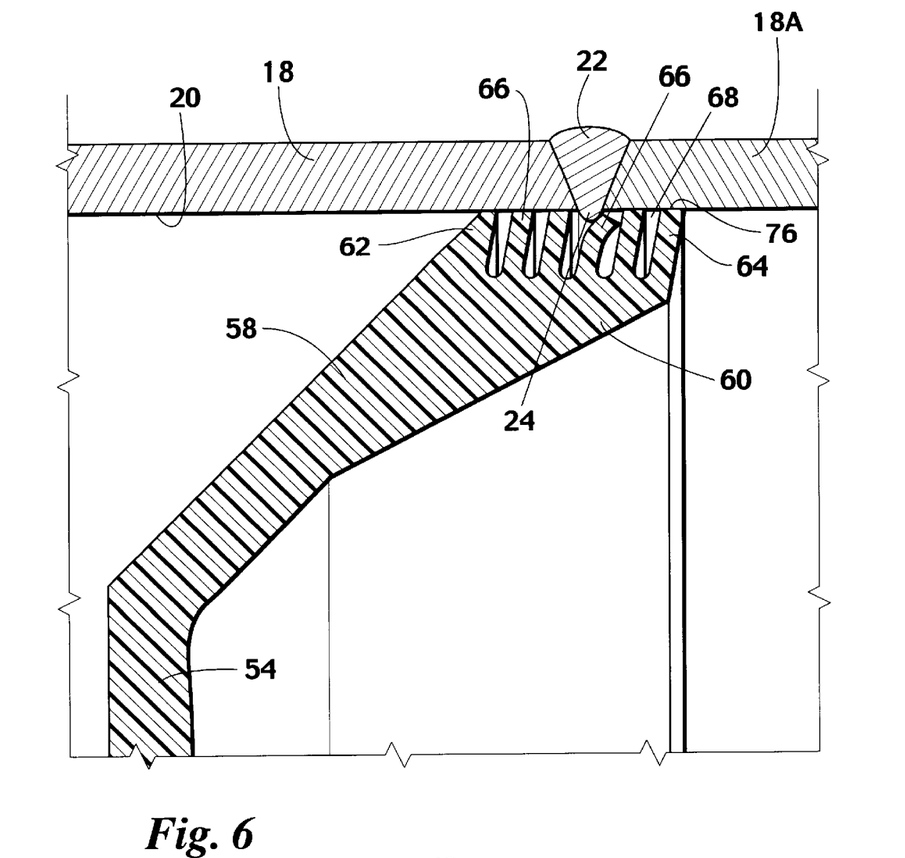
Figure 7:
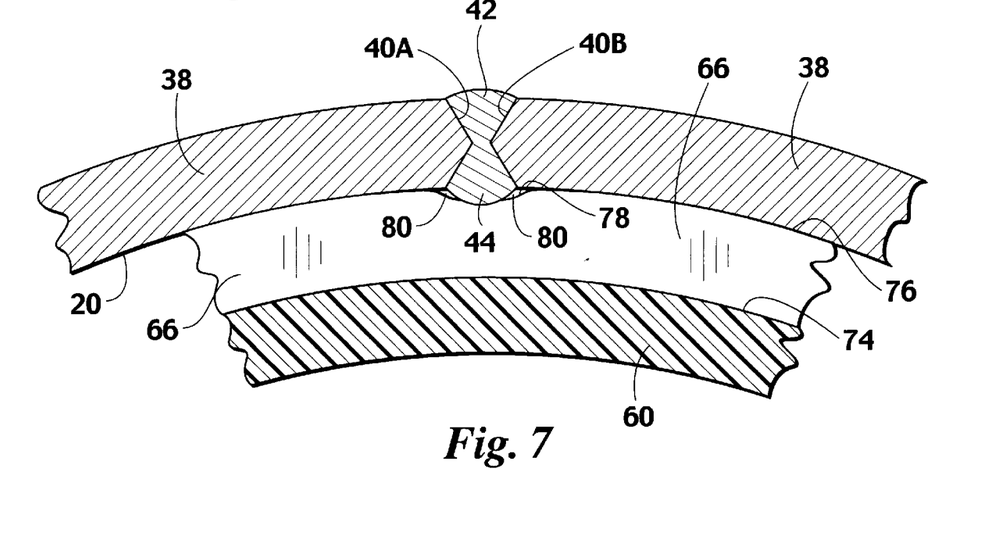
FIG. 7 shows a fragmentary section of a pipeline in a cross-sectional view taken perpendicular to the longitudinal axis of the pipeline and shows a longitudinal welding bead as illustrated in FIG. 3. This figure shows in vertical cross-section one of the plurality of circumferential lips of the squeegee cup of this invention, the circumferential lip having a high degree of flexibility, illustrating that the leakage path caused by the longitudinal weld is substantially reduced by use of the squeegee cup.

The multi-lip cups or discs of this disclosure (See FIGS. 1 and 4 through 9) employ numerous flexible sealing lips and that more effectively maintain a seal both in a smooth internal pipe and in areas of protrusions into the bore of the pipe (See FIGS. 6 and 7).

In manufacturing a cup that employs the principal of this invention, it is important that a plurality of circumferential, spaced apart lips be employed. The width or thickness of the circumferential lips may be about 3/16" and the width of the grooves may typically be about 3/16", with the depth of the grooves and therefore the radial length of the integral circumferential lips being several times the width of the lips. As an example, when the lips are about 3/16" wide, the depth of the grooves, and therefore the radial height of the integral lips may be about 5/8".

The number of grooves, and therefore the number of circumferential lips may vary from a few, such as three or four, to a much greater number, such as ten, twelve or more, depending upon the length of the cup or disc as the length is measured in a plane of the longitudinal axis of the pipeline pig to which the cup is attached. The depth of the grooves must be sufficient to create a high degree of flexibility of the circumferential lips but not so great as to rob the lips of sufficient resilience to securely engage the internal circumferential surface of the pipeline in which the cup is employed.

While the drawings illustrate multi-lip cups and discs in which the slots and thereby the integral circumferential lips extend radially of the cup circumferential axis, the concept of this invention is not so limited. That is, the grooves forming the circumferential lips may be at an angle greater or less than 90° with respect to a longitudinal axis of the disc or cup.

The invention is concerned with elastomeric cups utilized on pipeline pigs. By "elastomeric" means a material having resilience to deflection. Materials which are suited for use in the manufacture of multi-lip discs or cups of the type disclosed herein include rubber, urethane or plastic materials having similar properties.

Figure 1:
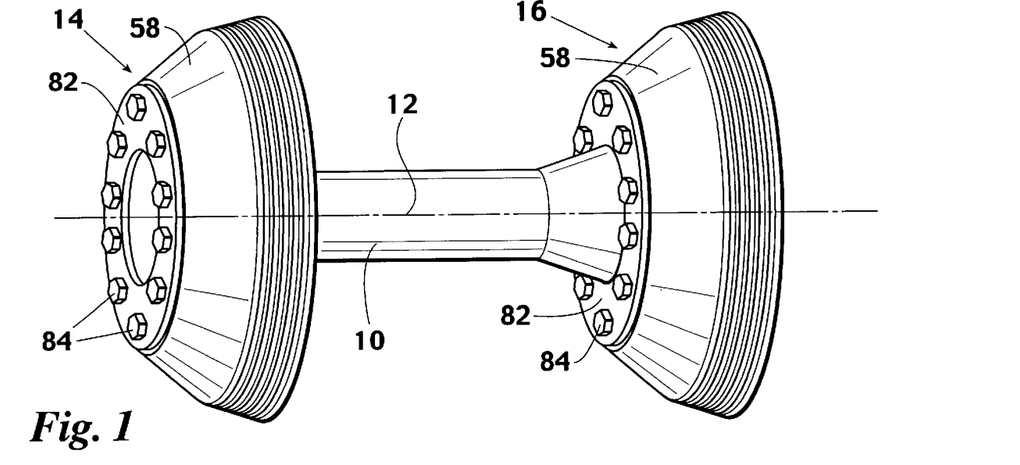
FIG. 1 is an isometric of a pipeline pig employing the squeegee cups of this invention.

FIG. 1 shows a typical type of pipeline pig that is equipped with cups that employ the principals of this invention. The typical pipeline pig includes a longitudinal body 10 that can be of various shapes and configurations, the body having support structures by which it is maintained within a pipeline. The support structures ideally maintain the longitudinal axis 12 of body 10 substantially coincident with the cylindrical axis of the pipeline in which the pig travels. The structures to support pig body 10 concentrically within the pipeline may include scrapers, rollers or the like, however, in the embodiment as illustrated in FIG. 1 the forward and rearward structures 14 and 16 are in the form of elastomeric cups. The cups that form the forward and rearward structures 14 and 16 of FIG. 1 are squeegee-type cups, that is, cups with multiple lips that incorporate the principals of this invention and that will be subsequently described in detail.

Figure 2:
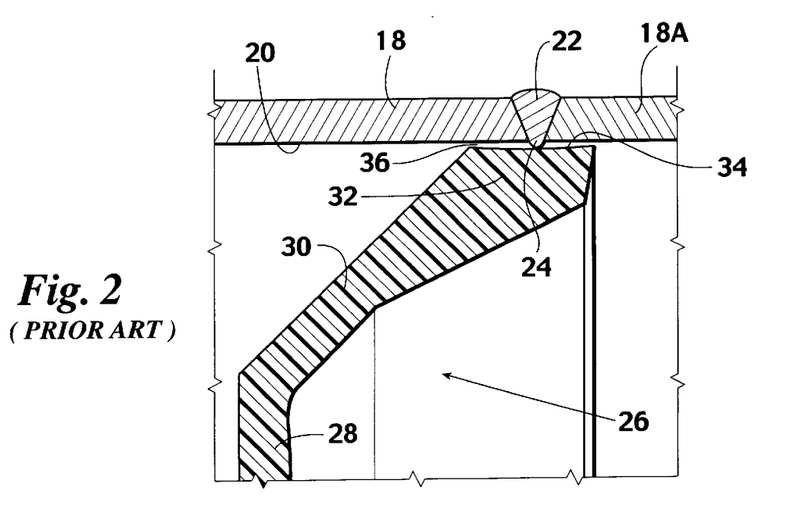
FIG. 2 is an enlarged fragmentary view of a outer portion of a typical type elastomeric cup in present use, the cup being supported to a pipeline pig body (not shown). A fragmentary portion of a pipe sidewall shows a circumferential welding bead. This view illustrates the relationship between a cup of a type in the present use as it passes a circumferential welding bead.

FIG. 2 is a partial elevational cross-sectional view of a pipeline wall 18 having an interior circumferential surface 20. Pipeline 18 is of the type most commonly employed in construction of pipelines wherein longitudinal pipeline sections 18 and 18A are butt welded, that is, where adjacent lengths of pipe are joined end-to-end by circumferential welds 22. To ensure the full strength of the pipeline, welds 22 characteristically include an inner circumferential bead 24 that protrudes irregularly into the interior cylindrical surface 20 of the pipeline.

In FIG. 2 a conventional elastomeric cup 26 is illustrated in cross-section. The conventional cup 26 has typically a radially extending inner portion 28 that is geometrically configured to be secured to a pig body, such as a body 10 of FIG. 1. Extending from inner portion 28 is a frusto-conical cup portion 30, and beyond conical cup portion 30, an outer portion 32 that provides a pipe wall engaging circumferential surface 34. In FIG. 2 the surface 34 is shown as being slightly displaced from the interior pipe wall 20 by weld bead 24 showing that a gap 36 may be temporarily created when a cup of the standard design encounters an internal circumferential weld bead in a pipeline.

Figure 3:
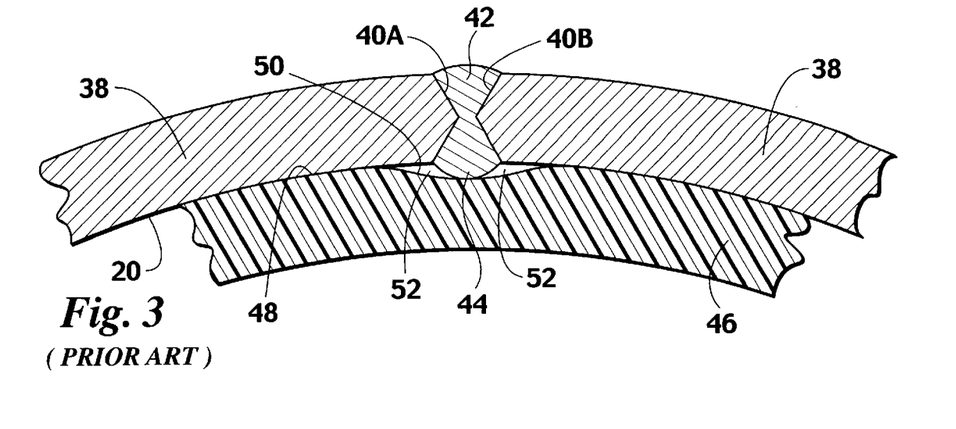
FIG. 3 is a fragmentary cross-sectional view of a portion of a pipeline wall that has a longitudinal welding seam. Shown in cross-section is the outer circumferential portion of an elastomeric cup that is a part of a pipeline pig as in FIG. 2. The deflection of the cup sealing surface by the longitudinal weld bead is illustrated.

FIG. 3 is a cross-section of a pipeline of the type in which a length of pipe is formed by folding a longitudinal sheet 38 of steel so that the opposed edges 40A and 40B are adjacent each other. The opposed edges are welded together with a longitudinal weld seam 42 to form a length of pipe. The weld seam inevitably provides a longitudinal internal bead 44. The outer portion 46 of an elastomeric cup has a circumferential surface 48 that is inwardly deflected at 50 by weld bead 44 producing leakage passageways 52.

FIGS. 2 and 3 are not intended to be literally precise as having been made from actual measurements of cups in a pipeline but are diagrammatic to illustrate characteristics of typical elastomeric cup in present use when the cups contact internal circumferential or longitudinal weld beads. That is, FIGS. 2 and 3 are illustrative of problems that might exist with the use of a typically available elastomeric cup in a pipeline having welded seams.

Figure 4:
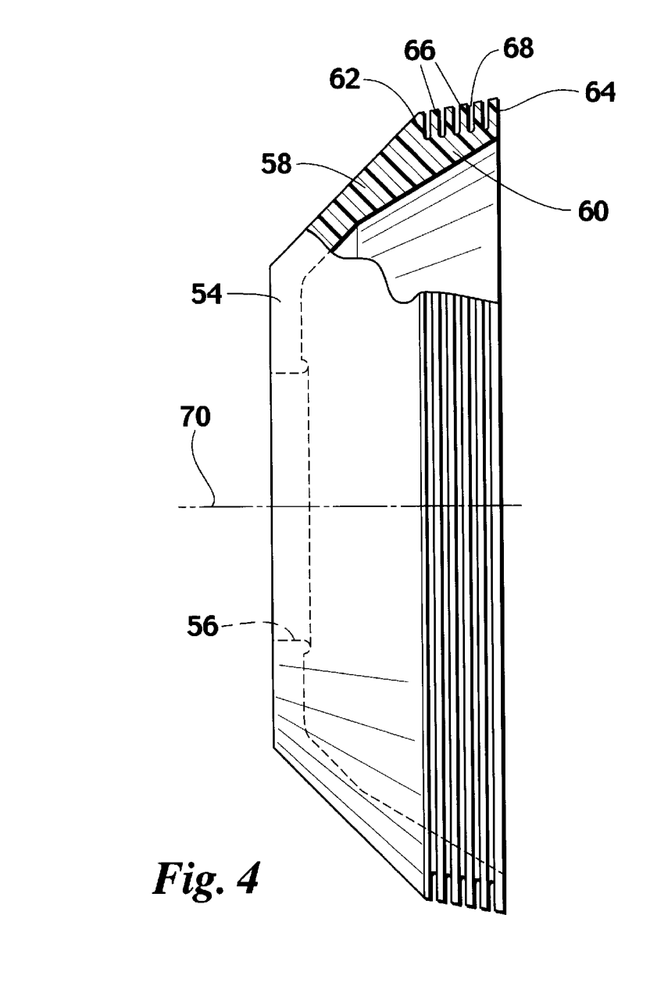
FIG. 4 is an elevational side view, shown partially cut away, of a squeegee-type cup that illustrates the principals of this invention.

The improved cup of this invention is best illustrated in FIGS. 4 and 5 to which reference is now made. The basic structural configuration of the cup of FIGS. 4 and 5 is substantially the same as the prior art cup shown in FIG. 2. The cup is integrally formed of elastomeric material, such as urethane, and includes a central radial extending portion 54 that typically has a large diameter opening 56 therein to facilitate mounting the cup to a pipeline pig body. Integrally extending from radial portion 54 is a frusto-conical portion 58 and an outer working portion of the cup indicated by the numeral 60. Formed on the exterior circumferential pipe wall engaging surface of outer portion 60 are a plurality of spaced apart circumferential lips. In the illustrated arrangement there is a forward lip 62, a rearward lip 64 and several intermediate lips 66. Between adjacent lips are circumferential spaces 68.

In the preferred arrangement the width of intermediate lips 66 and width of spaces 68 are approximately the same although this relationship can vary. For instance, in FIG. 5 the width of lips 66 is slightly greater than the width of spaces 68.

The essence of the invention is a "squeegee" type cup, that is, a cup of elastomeric material having on its outer peripheral working surface a plurality of closely spaced, flexible integral circumferential lips separated by circumferential spaces. By "plurality" means a minimum of at least three closely spaced integral lips with a minimum of two circumferential spaces separating the three lips. However, in the preferred arrangement, more than three lips are employed.

To accomplish the intended results of this invention the integral circumferential lips must be of a relatively narrow width, the width being measured parallel to a cup cylindrical axis 70, as seen in FIG. 4. The width of the circumferential lips are preferably at least about ⅛" and not more than ¼" however if the cup is of a very large diameter, such as 3–4 feet or greater, the height of the integral lips and the width of the lips can be increased.

The height of the lips is measured from the bottom of grooves 68 to the outer pipe contacting edge of the lips, such height being indicated by the numeral 72 in FIG. 5. The height 72 of the lips is a multiple of the width of the lips. For instance, if a lip is of width or thickness of ⅛" the height 72 of the lip should be at least ¼" but, preferably, a multiple of at least three to four times the width of the lips. Thus, a lip of ⅛" width should be at least about ⅜" or ½"high.

Advantages of the embodiment of the squeegee cup disclosed in FIGS. 4 and 5 is illustrated in FIGS. 6 and 7. FIG. 6 shows the action of the squeegee cup as compared to that of the prior art cup of FIG. 2. As seen in FIG. 6 all of the circumferential lips are in contact with the pipe cylindrical wall 20 except for one of the intermediate circumferential lips 66 which is deflected by bead 24. This shows that even when passing an internal, and irregular circumferential bead the squeegee cup can continue to maintain a complete seal of the cup periphery with the pipe cylindrical wall 20. That is, when the squeegee cup passes an object on the interior of the pipe wall, such as an encrustation, dent and so forth that is of a longitudinal dimension less than the full width of the cup then not all of the circumferential lips are deflected at one time so that unless the obstruction or dent is of a longitudinal length greater than the width of the entire cup contacting surface a better seal is maintained between the cup in the pipe wall.

FIG. 7 shows a squeegee cup of FIGS. 4 and 5 passing along a longitudinal weld. FIG. 7 is a cross-sectional view taken through a cup outer portion 60 and through a circumferential space 68 and shows the rear of a circumferential lip 66. The bottom of a space is indicated by the circumferential line 74 while the outer circumferential edge of a circumferential lip 66 is indicated by the line 76. Outer edge 76 is slightly inwardly deflected by internal bead 44, the inward deflection being indicated by the numeral 78 to cause small leakage pathways 80. The leakage pathways 80 are in principal the same as the leakage pathways 52 of FIG. 3 except that due to the much greater flexibility of the circumferential lips the inward deflection caused by longitudinal weld bead 44 produces significantly reduced or no leakage pathways 80 at all depending upon the actual contour of the longitudinal bead compared to the commonly used elastomeric cup which produces the much larger leakage pathways 52 as seen in FIG. 3. Thus, while the squeegee cup may not necessarily completely seal the interior of a pipeline against longitudinal defects nevertheless the highly increased flexibility of the circumferential lips serve to reduce or eliminate leakage pathways.

FIG. 1 is an illustration of a pipeline pig in which two of the cups as illustrated in FIGS. 4 and 5 are employed to complete the pig. Metal plates 82 of diameter essentially equal to the diameter of the cup radial portion 54 are employed to mount the cups to the pipeline pig body. Bolts 84 extend through plates 82 and through openings 86 in the cups as seen in FIG. 5 to attach the cups to the pipeline pig body. The specific way of attaching the cup is not a part of this invention since pipeline pig construction is well known in the art. In fact the cups could be an integral part of the pig body in which the body and cups are all one piece and made of an elastomeric material.

Figures 8, 9:
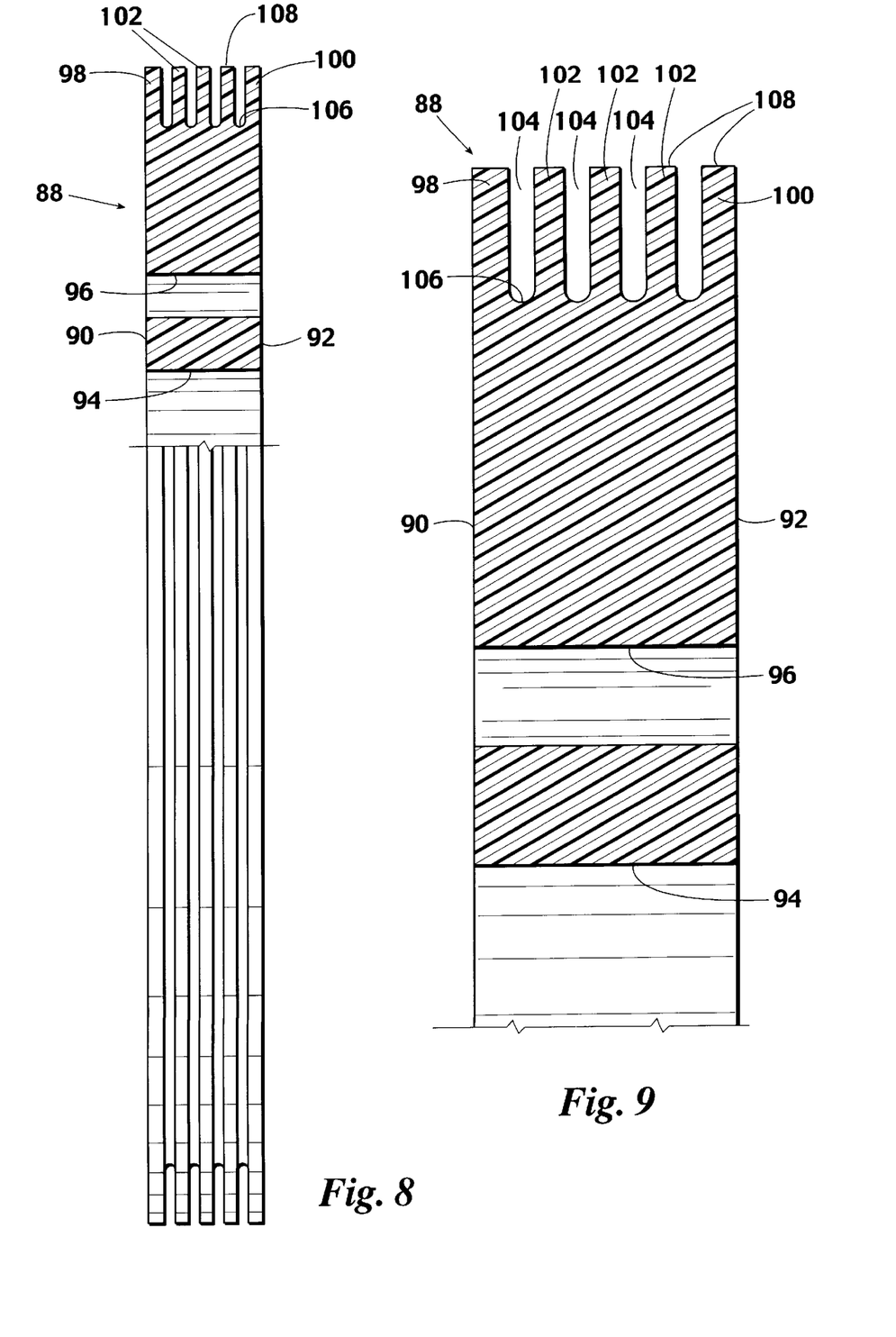
FIG. 8 is an elevational view, shown partially in cross-section, of a disc formed of elastomeric material, the disc having a plurality of circumferential lips that perform a squeegee function when the disc is used on a pipeline pig.
FIG. 9 is an enlarged elevational cross-sectional view of a section of the squeegee-type disc of FIG. 8.

FIGS. 8 and 9 show an alternate embodiment of the invention in the form of a disc rather than a cup. A disc, indicated generally by the numeral 88, is a unitary member formed of elastomeric material such as rubber or plastic, including specifically urethane, and includes a radial forward surface 90 and rearward surface 92. Pipeline pig discs typically have a central opening 94 providing a means by which they are supported to a pig body, and bolts are received through openings 96, however, the central opening 94 and bolt opening 96 may vary considerably and other geometrical arrangements may be employed by which a disc 88 is supported to a pig body structure.

The distinguishing feature of disc 88 of FIGS. 8 and 9 is the plurality of closely spaced-apart flexible integral circumferential lips, including forward lip 98, rearward lip 100 and intermediate lip 102, the illustrated embodiment of FIGS. 8 and 9 showing four such intermediate lips 102. The lips are closely spaced apart from each other by spaces 104, the spaces having a bottom edge 106 and the lips having a uniform top surface 108. The lips 98, 100 and 102 of the disc elastomeric member as employed on a pipeline pig have the same purposes, functions and advantages as described for the squeegee cup illustrated in FIGS. 4 and 5. The circumferential lips are of sufficient length to be highly flexible and are multiple, that is, the disc of FIGS. 8 and 9, to accomplish the purpose of this invention must be a number of at least three (and preferably more). The lips are separated by circumferential spaces 104 with the height of the lips being a multiple of the thickness of the lips, all as described with reference to FIGS. 4 and 5. A disc of FIGS. 8 and 9 functions in substantially the same way as the cup of FIGS. 4 and 5 to provide a squeegee-type member that closely adheres to the interior circumferential wall of a pipeline to obtain improved effectiveness of the sealing contact between the disc and the internal pipeline wall. The term "cup" is used in this disclosure is inclusive of a disc so that the expression "cup" means any elastomeric member configured for use on or as a part of a pipeline pig having an outer circumferential surface formed by a plurality of closely spaced apart highly flexible integral circumferential lips.

Figure 10:
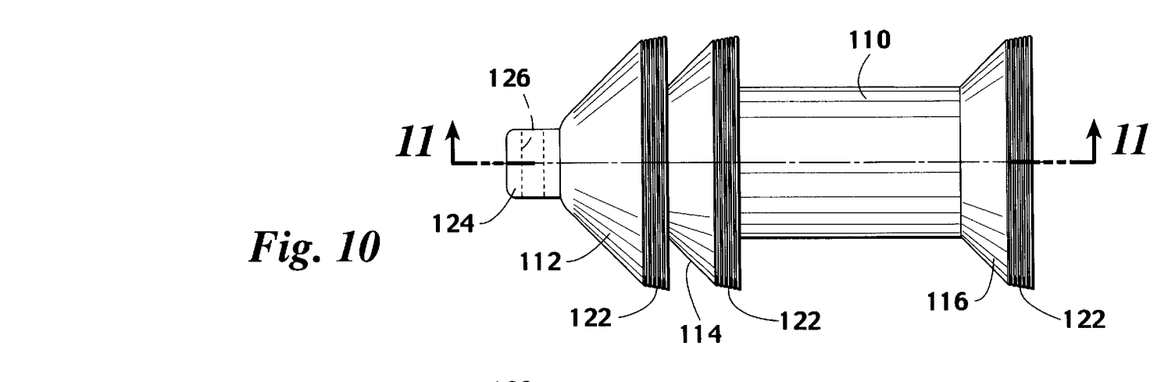
Figure 11:
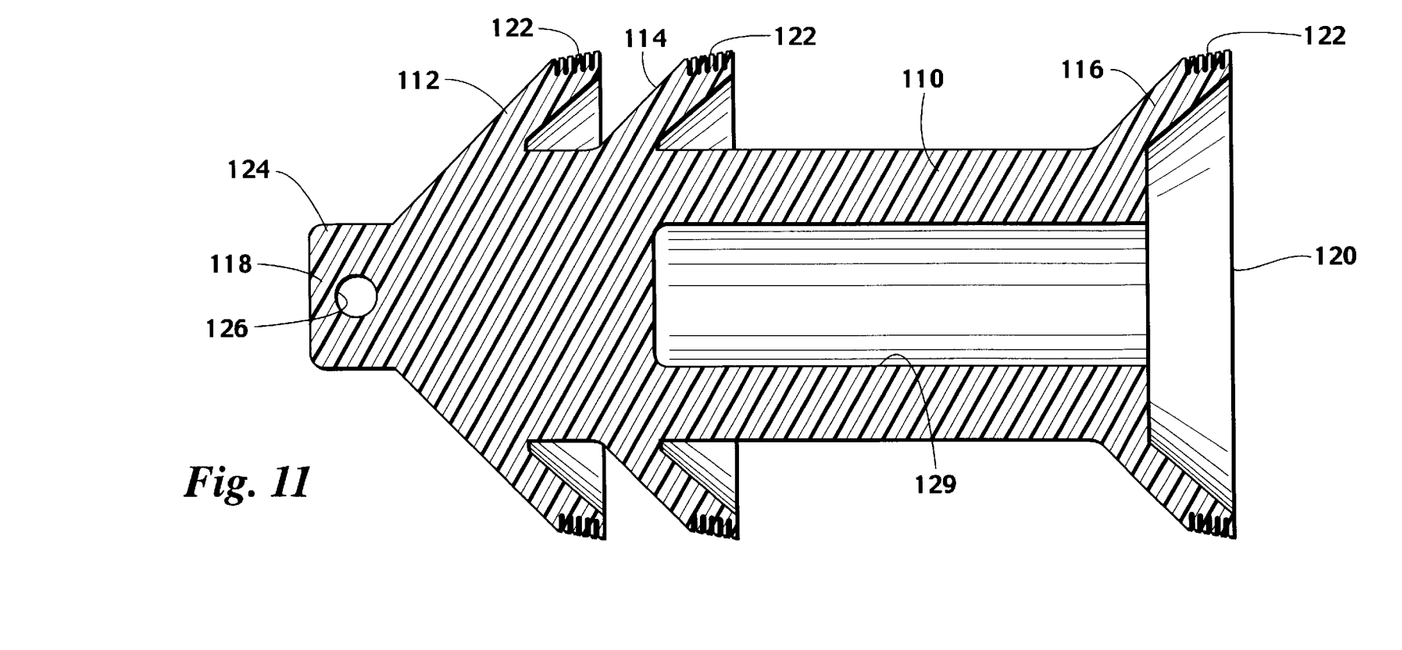
FIG. 11 is a cross-sectional view taken along the line 11—11 of FIG. 10.

Referring to FIGS. 10 and 11, an alternate embodiment of the invention is illustrated. Whereas FIG. 1 illustrates a pipeline pig having a forward and rearward cup and a longitudinal body typically made of metal, such as steel, to which the cups are removably attached, FIGS. 10 and 11 show the embodiment wherein the cups and pig body are integrally formed of elastomeric material. The elastomeric body is indicated by the numeral 110. Extending integral from the body 110 are spaced apart cups 112, 114 and 116. Each of the cups is inclined rearwardly with respect to pig body 110, the forward end of the pig body being indicated by numeral 118 and the rearward end by the numeral 120. Each of the cups 112, 114 and 116 has on its outer circumferential surface a plurality of spaced apart flexible integral lips, generally indicated by the numeral 122. The lips are configured using the general principles illustrated and described in detail with respect to FIGS. 4 through 7.

The integral pig body 10 has at the forward end 118 of an integral nose portion 124 having a lateral opening 126 therethrough, a practice common with integral elastomeric pigs. Further, the pig body 110 has a central recess 129, the main function of which is to reduce the weight of the elastomeric pig and the quantity of elastomeric material required for its construction.

The elastomeric pig of FIGS. 10 and 11 functions in the same way to produce the same results as the pig shown in FIG. 1 that employs cups as illustrated and described in FIGS. 4 through 7, the only significant difference being that in the embodiment of FIG. 1 the cups are removably attached to a pig body whereas in FIGS. 10 and 11 the cups are integrally with an elastomeric pig body.

Figure 12:
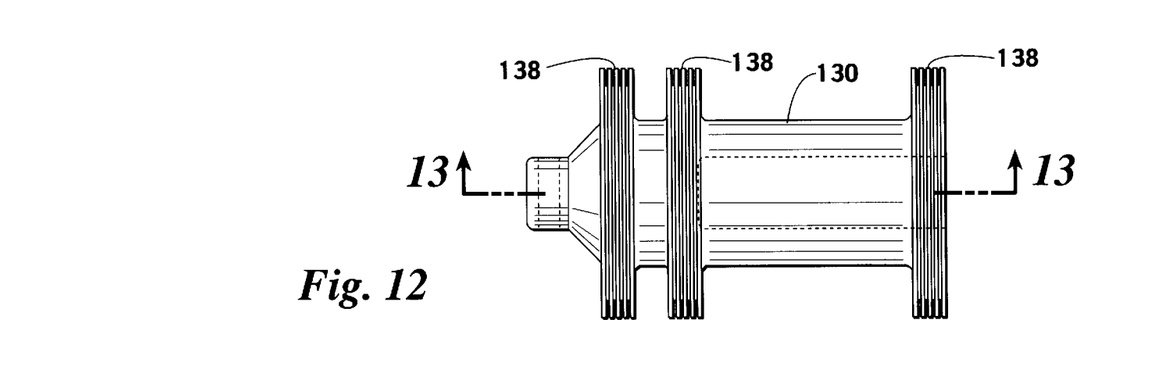
FIG. 12 is an elevational external view as in FIG. 10 but showing a pipeline pig made of elastomeric material wherein discs are integrally formed with the pig body, each of the discs having on its outer circumferential surface a plurality of lips.
Figure 13:
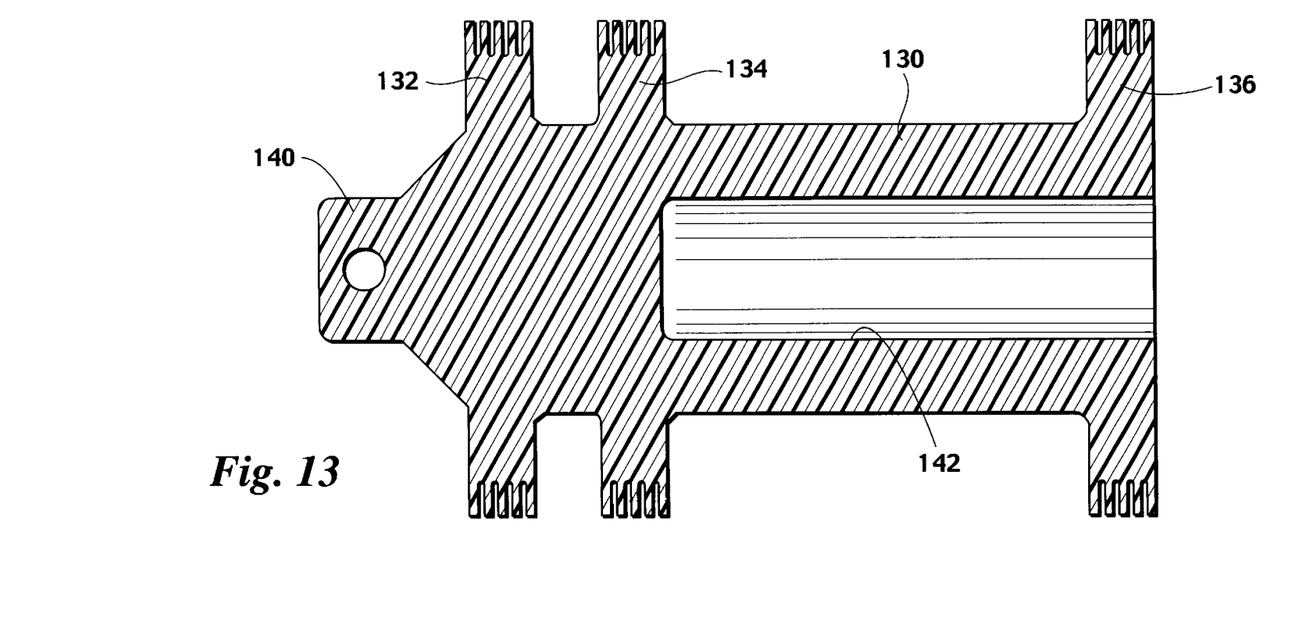
FIG. 13 is a cross-sectional view taken along the line 13—13 of FIG. 12.

FIGS. 12 and 13 show an additional alternate embodiment of the invention, similar to FIGS. 10 and 11 except that in FIGS. 12 and 13 the pig has integral radially extending discs.

Specifically, FIGS. 12 and 13 show an elastomeric pig body 130 having three radially extending integral disc portions 132, 134 and 136, each of the disc portions having on its outer circumferential surface a plurality of integral flexible spaced apart circumferential lip portions indicated by the numeral 138, the lip portions being the same as has been illustrated and described with reference to FIGS. 8 and 9. The difference between the discs as illustrated in FIGS. 8 and 9 and the integral pig of FIGS. 12 and 13 is that the integral pig does not employ removable or replaceable discs, however, the function of the discs are the same.

The pipeline pig of FIGS. 12 and 13 has a nose portion 140 and a central recess 142 substantially like FIGS. 10 and 11 and these have the same purposes.

Thus, FIGS. 10, 11, 12 and 13 show that the invention can be practiced with integral cups or discs or with removable cups or discs. Whereas in the illustration of FIG. 1, two cups are employed and in FIGS. 10 through 13, three cups or discs are employed indicating that the number of cups or disc employed on a pig is not material to the invention. Specifically, in either embodiment of an integral or separable pig body, the number of cups is not material as long as at least one cup has an outer circumferential peripheral surface formed of a plurality of closely spaced apart individually flexible integral circumferential lip portions.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed:

1. An improved cup for use as a part of a pipeline pig that provides squeegee action in a pipeline comprising an elastomeric member having a central portion and an intermediate portion of generally frusto-conical configuration that is integral with an outer circumferential pipeline wall engaging portion having a plurality of at least three closely spaced apart circumferential lip portions each engaging substantially a full 360° interior of the pipeline and each having a lip thickness, the integral lip portions being separately flexible with respect to each other, each lip portion having a radial length that is at least twice its thickness.

2. An improved cup for use as a part of a pipeline pig according to claim 1 wherein said lips are spaced apart a distance of about lip thickness.

3. An improved cup for use as a part of a pipeline pig according to claim 1 wherein the cup is cylindrical and has a cylindrical axis and wherein said lips extend substantially radially of the cylindrical axis.

4. An improved cup for use as a part of a pipeline pig according to claim 1 wherein a pipeline pig for which the cup is useable has a direction of travel in a pipeline and wherein each said circumferential lip portion is deflected in a direction opposite the pipeline pig direction of travel in a pipeline.

5. An improved cup according to claim 1 wherein said pipeline pig includes a pipeline pig body and wherein the cup is configured to be removably attached to the pipeline pig body.

6. An improved cup according to claim 1 wherein said pipeline pig includes a pipeline pig body and wherein said cup central portion is configured for removable attachment to the pipeline pig body.

7. An improved cup according to claim 1 wherein said pipeline pig includes a pipeline pig body and wherein the cup is integrally formed with the pipeline pig body.

8. An improved cup according to claim 1 wherein said pipeline pig includes a pipeline pig body and wherein said elastomeric member central portion is integrally formed as a part of the pipeline pig body.

9. An improved cup according to claim 1 wherein said lip portions are of substantially uniform thickness throughout substantially the full radial length thereof and terminate at an outer pipeline engaging circumferential edge of width substantially equal to said substantially uniform thickness.

10. An improved pig that provides squeegee action in a pipeline for use in and having a direction of travel in the interior of a pipeline, comprising;

a longitudinal body having a forward end and a rearward end;

a first pipeline interior wall engaging structure adjacent said body forward end;

a second pipeline interior wall engaging structure adjacent said body rearward end, said first and second wall engaging structures serving at least in part to support said body within a pipeline, at least one of said wall engaging structures being an elastomeric cup member having an outer circumferential pipeline wall engaging portion having a plurality of at least three closely spaced apart integral circumferential lip portions each engaging substantially a full 360° interior of the pipeline and each having a lip thickness, the integral lip portions being separately flexible with respect to each other, each lip portion having a radial length that is at least twice its thickness.

11. An improved pig according to claim 10 wherein said integral lip portions are spaced apart a distance of about said lip thickness.

12. An improved pig according to claim 10 wherein said longitudinal body has a longitudinal axis and wherein said lip portions of said elastomeric cup member portions extend substantially radially of said longitudinal axis.

13. An improved pig according to claim 10 whereby each said lip portion is deflected in a direction opposite the pipeline pig direction of travel in a pipeline.

14. An improved pig according to claim 10 in which said elastomeric cup has a central portion configured for removable attachment to said longitudinal body.

15. An improved pig according to claim 10 wherein said elastomeric cup is at least substantially in the form of a disc having a central portion, an integral intermediate portion extending radially of said central portion and an integral circumferential outer portion having said plurality of closely spaced apart integral circumferential lip portions.

16. An improved pig according to claim 15 in which said central portion, said intermediate portion and said outer portion are all of substantially equal length.

17. An improved pig according to claim 15 wherein said elastomeric cup central portion is configured for removable attachment to said longitudinal body.

18. An improved pig according to claim 15 wherein said central portion is integrally formed as a part of said longitudinal body.

19. An improved pig according to claim 10 wherein said elastomeric cup member is removably attached to said longitudinal body.

20. An improved pig according to claim 10 wherein said cup is integrally formed with said longitudinal body.

21. An improved pig according to claim 10 wherein said longitudinal body, said first wall engaging structure and said second wall engaging structure are integrally formed of elastomeric material.

22. An improved pig according to claim 10 wherein said wall engaging lip portions are of substantially uniform thickness throughout substantially the radial length thereof and terminate at an outer pipe line engaging circumrerential cylindrical edge of width substantially equal to said substantially uniform thickness.

23. An improved cup for use in a pipeline as a part of a pipeline pig comprising an elastomeric member substantially in the form of a disc having a central portion, an intermediate portion extending radially of said central portion and having an outer circumferential pipeline wall engaging portion defined by a plurality of at least three closely spaced apart circumferential lip portions that engage substantially the full 360° interior of the pipeline, each lip portion having a lip thickness, the lip portions being separately flexible with respect to each other, each lip portion having a radial length that is at least twice its thickness.

24. An improved cup for use as a part of a pipeline pig according to claim 23 in which said central portion, said intermediate portion and said outer portion are all of substantially equal length.

25. An improved cup according to claim 23 wherein said pipeline pig includes a pipeline pig body and wherein said disk central portion is configured for removable attachment to the pipeline pig body.

26. An improved cup according to claim 23 wherein said pipeline pig includes a pipeline pig body and wherein said elastomeric member central portion is integrally formed as a part of the pipeline pig body.

* * * * *